(12) United States Patent
Li et al.

(10) Patent No.: US 12,725,441 B2
(45) Date of Patent: Sep. 1, 2026

(54) HEAD WEARABLE DEVICE EAR BIOMETRIC SYSTEM

(71) Applicant: LENOVO (SINGAPORE) PTE. LTD, Singapore (SG)

(72) Inventors: Scott Li, Cary, NC (US); Robert James Norton, Jr., Raleigh, NC (US); Robert J. Kapinos, Durham, NC (US); Russell Speight Vanblon, Raleigh, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 1254 days.

(21) Appl. No.: 17/561,936

(22) Filed: Dec. 25, 2021

(65) Prior Publication Data

US 2023/0206677 A1 Jun. 29, 2023

(51) Int. Cl.

| | |
|---|---|
| ***G06K 9/00*** | (2022.01) |
| ***G06V 10/141*** | (2022.01) |
| ***G06V 10/40*** | (2022.01) |
| ***G06V 10/80*** | (2022.01) |
| ***G06V 40/10*** | (2022.01) |

(52) U.S. Cl.

CPC ............ *G06V 40/10* (2022.01); *G06V 10/141* (2022.01); *G06V 10/40* (2022.01); *G06V 10/80* (2022.01)

(58) Field of Classification Search

CPC ...... G06V 10/141; G06V 10/40; G06V 10/80; G06V 40/10; G06F 21/32

See application file for complete search history.

(56) References Cited

U.S. PATENT DOCUMENTS

| | | | | |
|---|---|---|---|---|
| 6,181,803 | B1 * | 1/2001 | Davis | G06F 21/32 713/173 |
| 6,241,288 | B1 * | 6/2001 | Bergenek | G06V 40/1365 283/67 |
| 10,713,343 | B2 * | 7/2020 | Kawakita | G06F 3/167 |
| 10,823,960 | B1 * | 11/2020 | Cho | H04R 3/04 |
| 10,880,667 | B1 * | 12/2020 | Cho | G06V 10/7715 |
| 11,930,420 | B1 * | 3/2024 | Persson | H04W 4/02 |
| 2010/0075631 | A1 * | 3/2010 | Black | G06F 21/32 455/410 |
| 2017/0140221 | A1 * | 5/2017 | Ollila | G06V 40/19 |
| 2017/0359467 | A1 * | 12/2017 | Norris | H04S 7/305 |
| 2019/0041666 | A1 * | 2/2019 | Abele | G02B 27/00 |
| 2020/0065569 | A1 * | 2/2020 | Nduka | G06V 40/70 |
| 2020/0074055 | A1 * | 3/2020 | Lesso | G10L 17/10 |
| 2020/0342082 | A1 * | 10/2020 | Sapozhnykov | G06V 40/10 |

(Continued)

OTHER PUBLICATIONS

Yan, Ping, and Kevin W. Bowyer. "Biometric recognition using 3D ear shape." IEEE Transactions on pattern analysis and machine intelligence 29.8 (2007): 1297-1308. (Year: 2007).*

(Continued)

*Primary Examiner* — Avinash Yentrapati
(74) *Attorney, Agent, or Firm* — Brian J. Pangrle

(57) ABSTRACT

A method can include receiving sensed feature data of an ear via a sensor coupled to a head wearable device; comparing at least a portion of the sensed feature data to stored feature data in memory operatively coupled the head wearable device via a processor operatively coupled to the head wearable device; and, based at least in part on the comparing, authenticating an identity of a user of the head wearable device.

20 Claims, 12 Drawing Sheets

(56) References Cited

U.S. PATENT DOCUMENTS

| | | | | |
|---|---|---|---|---|
| 2021/0374391 | A1* | 12/2021 | Jorasch | G06V 40/19 |
| 2022/0261468 | A1* | 8/2022 | Lin | A61B 5/0295 |
| 2023/0073410 | A1* | 3/2023 | Tussy | G06F 21/32 |
| 2023/0252680 | A1* | 8/2023 | Ogino | G02B 7/36 348/175 |
| 2023/0350999 | A1* | 11/2023 | Irwin, III | G06F 21/34 |
| 2023/0351729 | A1* | 11/2023 | Tsukada | G06F 21/32 |
| 2023/0389812 | A1* | 12/2023 | Chung | A61B 5/02416 |
| 2023/0418916 | A1* | 12/2023 | Ogino | G06F 21/32 |

OTHER PUBLICATIONS

Intel RealSense D400 Series Product Family, Datasheet, Revision 005, Jan. 2019, Document No. 337029-005 (120 pages).

Cummings et al., A Novel Ray Analogy for Enrolment of Ear Biometrics, 2010 Fourth IEEE International Conference on Biometrics: Theory, Applications and Systems (BTAS), 27-29 Sep. 2010 (6 pages).

Yan and Bowyer, Biometric Recognition Using 3D Ear Shape, IEEE Transactions on Pattern Analysis and Machine Intelligence, vol. 29, No. 8, Aug. 2007 (12 pages).

Chang et al., Comparison and Combination of Ear and Face Images in Appearance-Based Biometrics, Oct. 2003, IEEE Transactions on Pattern Analysis and Machine Intelligence 25(9):1160- 1165, ABSTRACT (3 pages).

* cited by examiner

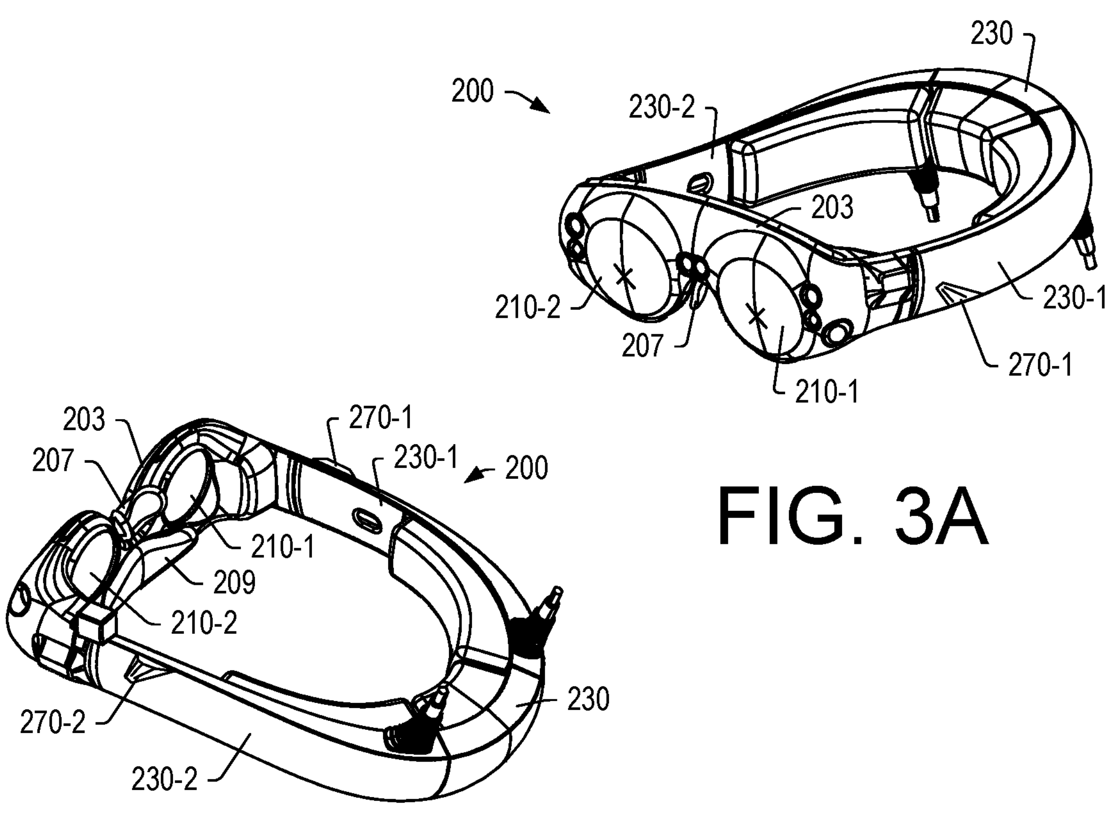
FIG. 3A
FIG. 3B
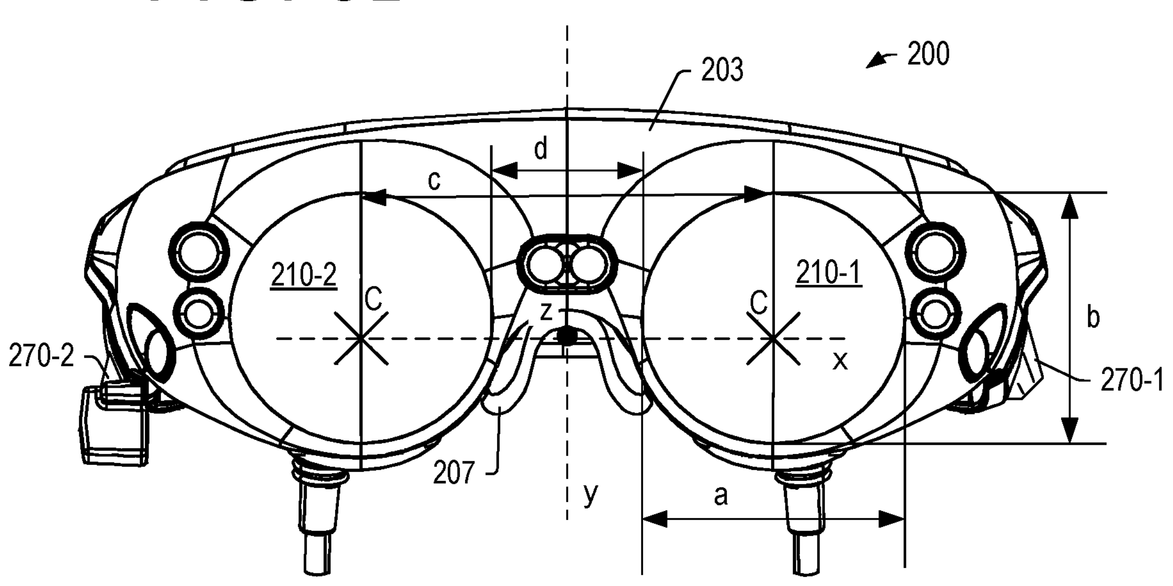
FIG. 3C

HEAD WEARABLE DEVICE EAR BIOMETRIC SYSTEM

TECHNICAL FIELD

Subject matter disclosed herein generally relates to head wearable devices such as head mounted display devices and systems.

BACKGROUND

A head wearable device can include a display assembly and can be worn on a user's head.

SUMMARY

A method can include receiving sensed feature data of an ear via a sensor coupled to a head wearable device; comparing at least a portion of the sensed feature data to stored feature data in memory operatively coupled the head wearable device via a processor operatively coupled to the head wearable device; and, based at least in part on the comparing, authenticating an identity of a user of the head wearable device. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 3A, FIG. 3B and FIG. 3C are a series of diagrams of views of an example of a headset;

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
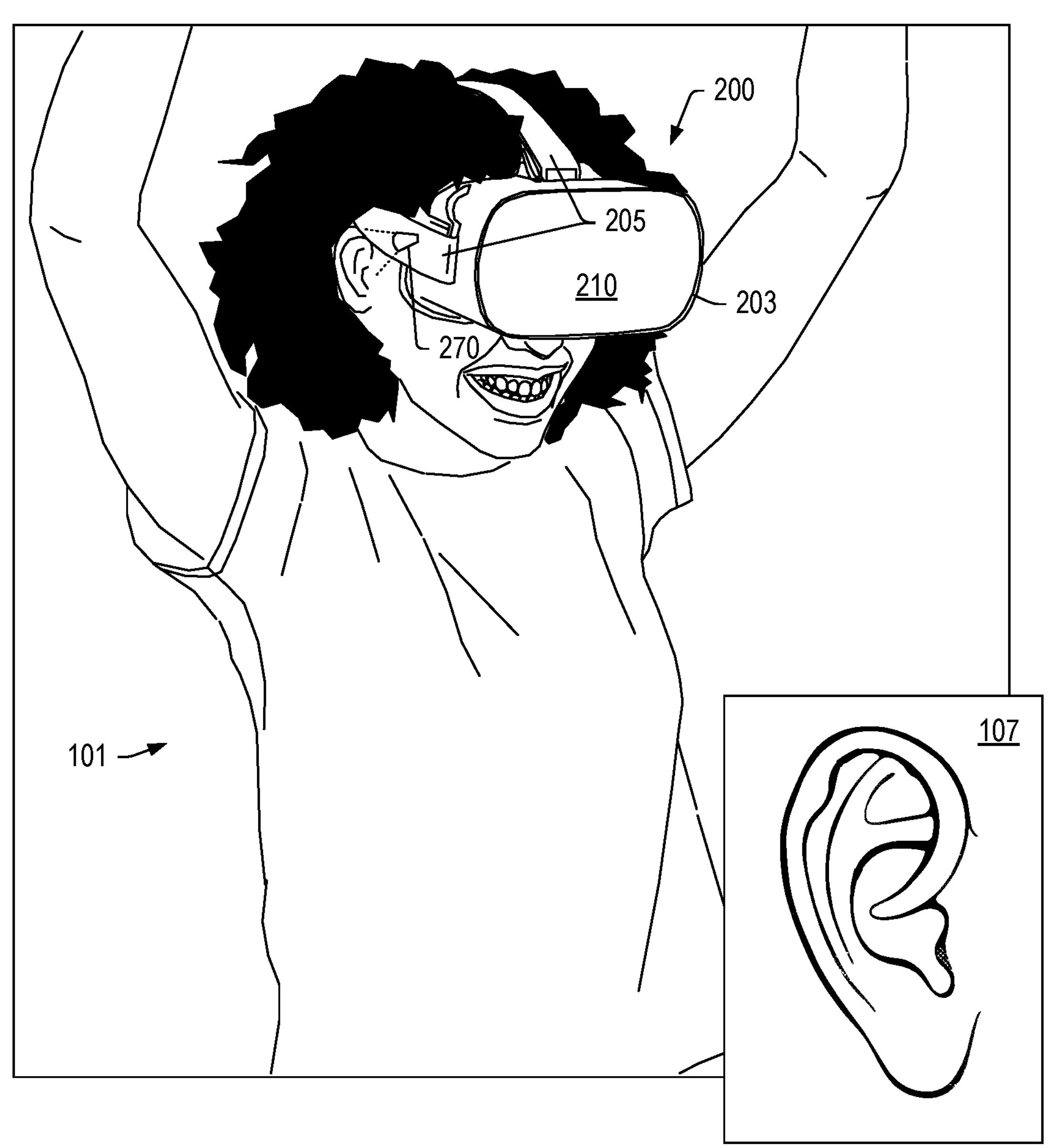
FIG. 1 is a diagram of an example scenario of a user and a headset.

FIG. 1 shows an example of a user 101 wearing a head mounted display system, which may be referred to as a headset 200. As shown in FIG. 1, the headset 200 can include a frame 203, head straps 205 coupled to the frame 203 and a display assembly 210 carried by the frame 203. The display assembly 210 may be of one or more types of configurations. For example, consider a see-through display, a projection display, etc.

In the example of FIG. 1, the headset 200 is shown as including a sensor 270. In such an example, the sensor 270 can have a field of view (FOV) where at least a portion of an ear 107 of the user 101 is within the FOV of the sensor 270.

As an example, the headset 200 can implement a method that includes receiving sensed feature data of the ear 107 via the sensor 270 as coupled to the headset 200 (e.g., a head wearable device); comparing at least a portion of the sensed feature data to stored feature data in memory operatively coupled the headset via a processor operatively coupled to the headset; and based at least in part on the comparing, authenticating an identity of the user 101 of the headset 200.

As to identity of a user, authentication can occur when one or more credentials provide for a match to one or more stored credentials. As to biometric approaches, a biometric can be a credential. For example, a fingerprint can be a biometric credential where sensed feature data of the fingerprint can be compared to a stored biometric credential (e.g., stored sensed feature data for the fingerprint). As an example, authentication may be performed using single-factor authentication (SFA), two-factor authentication (2FA) or higher multi-factor authentication (MFA). As an example, consider two or more of a user ID and a password along with a biometric signature (e.g., an ear signature, etc.).

As an example, a head wearable device can include one or more sensors that can sense features of an ear of a user (e.g., a wearer of the head wearable device). In such an example, the head wearable device can process sensed features of an ear, which can include biometric processing. A biometric is a type of body measurement or a metric computed from one or more body measurements. A biometric may provide for identification of an individual, authentication (e.g., based on identification, etc.), etc. For example, individuals can possess one or more ear features that are sufficiently distinctive to distinguish one individual from another individual.

As an example, one or more sensors, one or more techniques, etc., may be utilized to distinguish an artificial ear from an ear of a living human. In such an approach, an ear biometric system may be more robust to spoofing attempts (e.g., consider a prosthetic ear that can cover an actual ear as may be utilized by a makeup artist, a molded ear, etc.). As an example, an infrared sensor, a motion sensor, etc., may be utilized to verify that an ear is an ear of a living human. As to infrared sensing, a human ear can emit heat energy, which may provide a heat energy pattern. As to motion sensing, various muscles such as, for example, the anterior, superior and posterior auricular muscles (AAM, SAM and PAM), can provide for ear movements, which may be utilized to determine that an ear is an ear of a living human. As an example, infrared sensing and/or motion sensing may be utilized to determine one or more biometrics.

As to authentication, in various instances a head wearable device may acquire sensitive personal data, sensitive data about a user's environment (e.g., surrounding, etc.), execute licensed applications, etc. In such examples, one or more ear biometrics may be utilized as part of an authentication process to authenticate a user of a head wearable device. As an example, an authentication process may be performed at start-up, login, etc., and/or on a continuous or semi-continuous basis. For example, consider an authentication process that repeats at regular and/or irregular intervals. In such an example, if authentication does not occur, one or more actions may be taken such as, for example, terminating a network connection, terminating an application, terminating data storage, terminating sensing, etc. As an example, one or more authentication processes may be performed for business use, gaming use, entertainment use, etc., where such uses may be virtual reality (VR) uses, augmented reality (AR) uses, etc.

As an example, a head wearable device may utilize one or more identification techniques, one or more authentication techniques, etc. For example, an ear biometric approach may be combined with one or more other approaches (e.g., an eye biometric approach, a fingerprint approach, a password approach, etc.). As an example, an ear-based approach (e.g., for a single ear or left and right ears) can be implemented using a sensor or sensors such as, for example, a camera or cameras. In such an example, a user's eye or eyes are not at risk of being imaged or exposed to radiation to assure that an image can be properly formed. In an ear without eye approach, biometric information about a user's eye or eyes may remain secure and, for example, available for use in one or more other scenarios. As to ear biometric data, it may tend to be less useful in public scenarios, for example, due to a user having hair covering her ears, a hat or cap pulled down of her ears, etc. As such, a user may be more amenable to having a head wearable device utilize an ear biometric approach than another type of biometric approach. As an example, a head wearable device may provide for sensing to determine whether or not an ear of a user or ears of a user are adequately visible. In such an example, the head wearable device may issue a notification that indicates to the user that hair and/or another object may be obstructing a view of an ear or ears. In such an example, the user can make appropriate adjustment(s) such that her ear or ears can be imaged, etc.

As shown in the example of FIG. 1, the sensor 270 can have a rather limited FOV. As an example, the sensor 270 can have a limited depth of field (DOF). DOF can characterize a distance between a nearest object and a farthest object that are in acceptably sharp focus in an image. DOF can be calculated based on focal length, distance to subject, an acceptable circle of confusion size, and aperture. As an example, a sensor and/or one or more optical elements thereof may be chosen or tailored to have a DOF such that particular features of an ear are in acceptably sharp focus while farther objects are out of focus. In such an example, privacy and/or security may be enhanced as the sensor cannot capture images beyond the distance of the particular features of an ear. For example, a camera can have a limited DOF such that it cannot capture in-focus images of an environment of a user but rather can only capture in-focus images of the user's ear. Further, in such an approach, image analysis circuitry may implement one or more techniques such as edge detection where, due to lack of focus, a background region does not include detectable edges. Such an approach may be utilized to expedite image processing and, hence, identification, authentication, etc.

As to a camera, consider a camera that can include one or more optical elements (e.g., a lens or lenses) and associated circuitry. In such an example, the circuitry may include optical image stabilization circuitry, etc. Image stabilization circuitry may assist in instances where a head wearable device moves with respect to a user's head (e.g., due to a loose fit, etc.). Where a head wearable device is fit tightly and where a sensor (e.g., a camera, etc.) is coupled to the head wearable device, a user's ear may appear stationary (e.g., in a stationary reference frame), noting that gravity, etc., may be utilized to determine a position of the user's head in a global reference frame (e.g., of an environment such as a room, etc.). As an example, a camera can provide for a number of pixels, which may be rated in terms of megapixels (MP). For example, consider a camera that can provide for 0.1 MP to 10 MP or more. As an example, a camera may be a limited use camera that, as mentioned, may have a limited DOF, etc.

As an example, a sensor can include and/or operate in combination with a projector that may project over an area, which may be via a line (e.g., line scanning). For example, consider a sensor that is an assembly of components that may include an infrared sensor and an infrared laser. In such an example, the sensor can acquire sensed feature data of a human ear, which may include depth data (e.g., distance data). As an example, a sensor may provide for generation of a 3D model of a human ear via a projection and capture based approach.

As an example, a sensor may include one or more features of the REALSENSE technology (Intel Corporation, Santa Clara, Calif.), which can employ an optical camera, an infrared camera, and an infrared laser projector. In such an example, the three components may be utilized in combination to sense depth, detect human movement, and scan an ear in 3D. A document entitled "Intel® RealSense™ D400 Series Product Family" datasheet is incorporated by reference herein (Revision 005, January 2019, Document Number: 337029-005). As explained, a sensor may be configured to be limited in its DOF where, for example, privacy and/or security of an environment is desired. As an example, where a head wearable device includes a scanner (e.g., projector and imager) that can generate a model of an ear, if the scanner is not suitably positioned for scanning an ear during wear, a user may utilize the scanner to scan her ear where the head wearable device can generate a model for utilization with sensed feature data of a human ear as acquired by an appropriately positioned sensor or sensors. As an example, a scanner of a head wearable device, if included, may be a multifunction scanner (e.g., utilized for VR, AR, ear scanning, etc.).

As an example, a head wearable device (e.g., a headset or head mountable display (HMD), etc.) can include one or more sensors that can sense one or more ear features. For example, consider one or more of a full view of an ear, a view of a tubular portion of an ear, a view of a helix portion of an ear, etc.

As an example, a sensor may be a RGB sensor, an IR sensor, etc. As an example, a sensor may be utilized with one or more types of projection techniques. For example, consider a pattern projector that can project dots and/or lines onto at least a portion of an ear. In such an example, an image may be processed with reference to such dots and/or lines. As an example, dots and/or lines may be utilized as types of fiducial markers in an image where features of an ear may be referenced with respect to such fiducial markers.

As an example, a head wearable device may include one or more strobes, which may flash a pattern or patterns onto at least a portion of an ear or ears (e.g., in one or more colors, one or more regions of an electromagnetic spectrum, etc.). In such an example, imagery may be captured that can utilize the pattern or patterns for purposes of facilitating ear recognition (e.g., user identification, authentication, etc.).

As an example, a head wearable device can include circuitry that can perform feature extraction and/or feature classification as to one or more ear features. As an example, one or more types of machine learning models may be utilized. For example, consider a TENSORFLOW LITE (TFL) type of framework (GOOGLE LLC, Mountain View, Calif.) that can be suitable for implementation in an Internet of Things (IoT) type of system.

The TFL framework includes a set of tools that enables on-device machine learning (ML) for running models on mobile, embedded, and IoT devices. The TFL framework can provide for on-device machine learning optionally with low latency (e.g., without a round-trip to a server, etc.), with enhanced privacy (e.g., personal data does not leave the device), without connectivity (e.g., without Internet connectivity), with acceptable size (e.g., reduced model and binary size) and with relatively low power consumption (e.g., via efficient inference and a lack of network connections). The TFL framework may be implemented using ANDROID OS, iOS, embedded LINUX OS and/or other microcontroller devices. Support languages may include one or more of JAVA, SWIFT, Objective-C, C++, and PYTHON. As an example, the TFL framework can provide for one or more tasks such as, for example, image classification, object detection, pose estimation, question answering, text classification, etc. As an example, a head wearable device may include a lightweight ML framework that can perform one or more types of tasks, including an ear(s) feature(s) task or tasks.

As an example, a head wearable device can include circuitry that can utilize sensed ear information (e.g., sensed feature data of a human ear) to determine if a change in user has occurred. As an example, a new user may be instructed to commence an identification process, a machine learning process, etc. As an example, where multiple users utilize a common head wearable device, the head wearable device may be able to resume a prior session based at least in part via identification of a user via one or more ear features. For example, consider a user that can resume a game at a particular point in the game by simply fitting a head wearable device to his head. In such an example, the head wearable device can include memory that associates a last known state with a user (e.g., a user ID, etc.) where the last known state can be accessed and re-instantiated upon identification, authentication, etc., of the user. As an example, a head wearable device can determine via one or more sensors that can sense one or more ear features whether a session has been terminate, for example, by a user removing the head wearable device such that sensing of such one or more ear features can no longer occur.

As an example, the headset 200 can include circuitry that can at least detect an improper fit of the headset 200. For example, consider circuitry that can detect that the headset 200 is too loose (e.g., a loose-fitting headset). As an example, the headset 200 may include one or more features that can adjust the headset 200 such that its fit is improved. In such an example, one or more ear features may be utilized to determine whether fit is adequate and/or in need of improvement.

In various examples, a headset can include one or more motion sensors, which may be one or more inertia sensors and/or other types of sensors (e.g., position versus time, etc.).

Figure 2A:
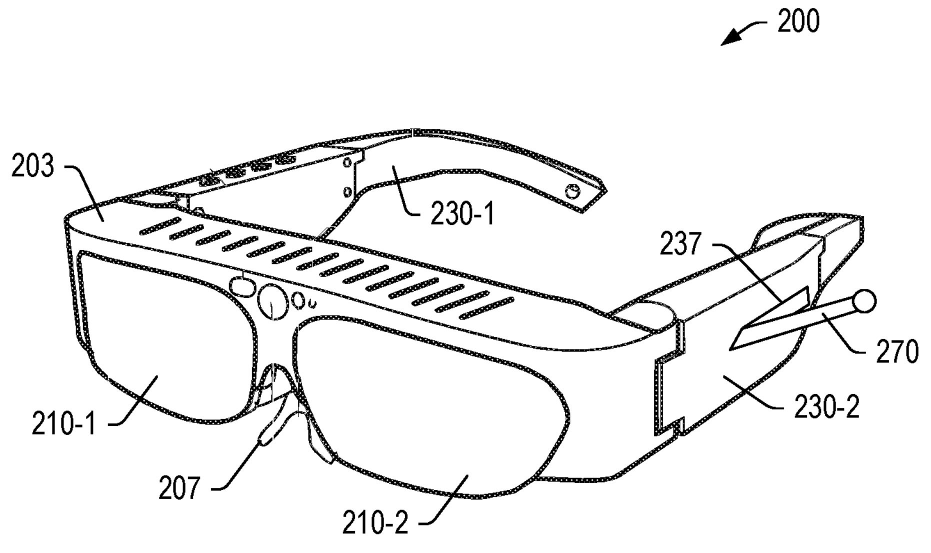
FIG. 2A and FIG. 2B are a series of diagrams of views of examples of a headset.
Figure 2B:
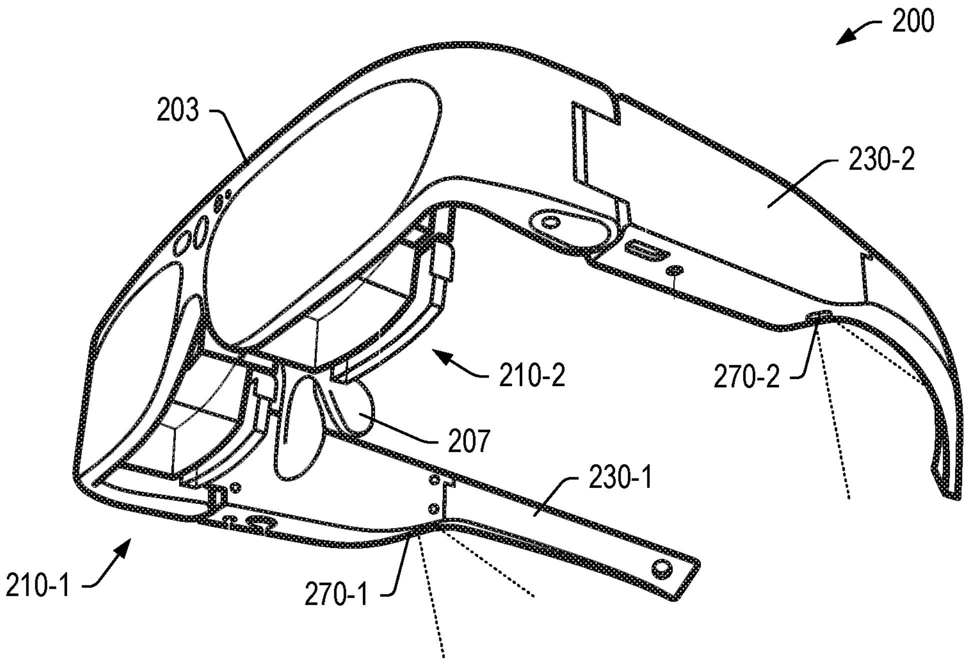

FIG. 2A and FIG. 2B show another example of the headset 200 as having temples 230-1 and 230-2 rather than the head straps 205. As shown in FIG. 2A and FIG. 2B, the display assembly includes two separate assemblies 210-1 and 210-2 that are carried by the frame 203 where a nose piece 207 can help support the headset 200 on a user's head along with the temples 230-1 and 230-2.

In the example of FIG. 2A, the sensor 270 is shown, which may be extended from a recess 237. For example, where a user desires using the sensor 270, it may be extended from the recess 237 such that the sensor 270 can have an acceptable FOV of at least a portion of an ear of a user. As an example, the sensor 270 may include an extension that can be telescoping, flexible, etc., such that it can be appropriately aimed at an ear. As an example, the sensor 270 may pop-out or pull-out of the recess 237 for use and, similarly, the sensor 270 may be pushed-in for storage (e.g., non-use).

In the example of FIG. 2B, the sensors 270-1 and 270-2 are shown as being integral in the temples 230-1 and 230-2, respectively. As shown, the integral positions of the sensors 270-1 and 270-2 can provide for appropriate sensing of one or more features of a right ear and one or more features of a left ear, respectively (e.g., with appropriate FOVs).

FIG. 3A, FIG. 3B and FIG. 3C show yet another example of the headset 200 as having a wraparound band formed by temples 230-1 and 230-2 and a joiner 230. As shown, the headset 200 can include one or more pads 209. As shown, the headset 200 can include the sensors 270-1 and 270-2 as left ear and right ear sensors, respectively.

In the front view of FIG. 3C, the headset 200 is shown along with a Cartesian coordinate system with x, y and z axes. As shown, the Cartesian coordinate system can have an origin that is defined by a mid-point of the frame 203 and points on the display assemblies 210-1 and 210-2. As an example, circuitry may acquire and/or analyze data using a coordinate system such as the coordinate system shown in FIG. 3C. In such an example, an x, y plane may be a plane for making, measuring and/or analyzing right and left data and a y, z plane may be a plane for making, measuring and/or analyzing up and down data.

In the example of FIG. 3C, a so-called boxed lens (boxing) system may be utilized to describe various features, for example, as described in British Standard EN ISO 8624:2011+A1:2015(E), which uses rectangles that contain each lens shape to determine the dimensions of the front of the frame.

In the box system of measuring spectacle fronts, a parameter C is the box center, a parameter a is a horizontal lens size, a parameter b is a vertical lens size, a parameter c is a boxed center distance (BCD), and a parameter d is a distance between lenses (DBL). FIG. 3C shows locations demarcating the parameters C, a, b, c and d.

As an example, a line joining and extending beyond the centers of the rectangles (the box centers) can be referred to as the horizontal center line (HCL). In selecting a frame for a wearer, an eye vision specialist may align the frame HCL with the lower limbus (bottom of the iris)/lower eyelid and as such a line connecting the right and left lower limbus may be considered to be a facial version of HCL when measuring for a handmade frame in the traditional sense. In various instances, there can be exceptions, for example specifying a handmade half eye, making an extra deep frame, or when styling a classic round eye style where the pupil center is required to be on box center rather than 5 mm or 6 mm above HCL. In such instances, a facial HCL which is used to determine bridge measurements such as crest height will be different to the HCL that joins the box centers and becomes an individual feature of the design that can be translated into standard measurements for proper understanding.

As an example, the horizontal box size may be referred to as the eye size and the DBL as the bridge. Such measurements may be found printed on frames, usually in combination with the total side length. As an example, the box center distance (BCD) may be referred to as the frame PD. In the example of FIG. 3C: BCD, $c=a/2+d+a/2=a+d$ where Frame PD=Eye Size+DBL.

For eyeglasses, the frame PD can be utilized such that a patient's actual PD is not to be greater than the frame PD, otherwise the eyes can be outset in the frame, which may look odd and restrict the patient's temporal field of view.

As an example, one or more parameters of the boxed lens (boxing) system and/or another system may be utilized for one or more purposes, which can include an ear biometric approach or approaches. For example, consider utilizing the HCL as a reference as to a right side or a left side of the HCL (e.g., with respect to the origin of a coordinate system, etc.). As explained, fit can be associated with comfort and proper positioning for renderings to be seen by one or more eyes of a user and/or for appropriate sensing of one or more ear features.

FIG. 3C also shows the nosepiece 207 as coupled to the frame 203. As shown, the nosepiece 207 may be disposed between the display assemblies 210-1 and 210-2, for example, substantially within the distance of the parameter d.

Figure 4:
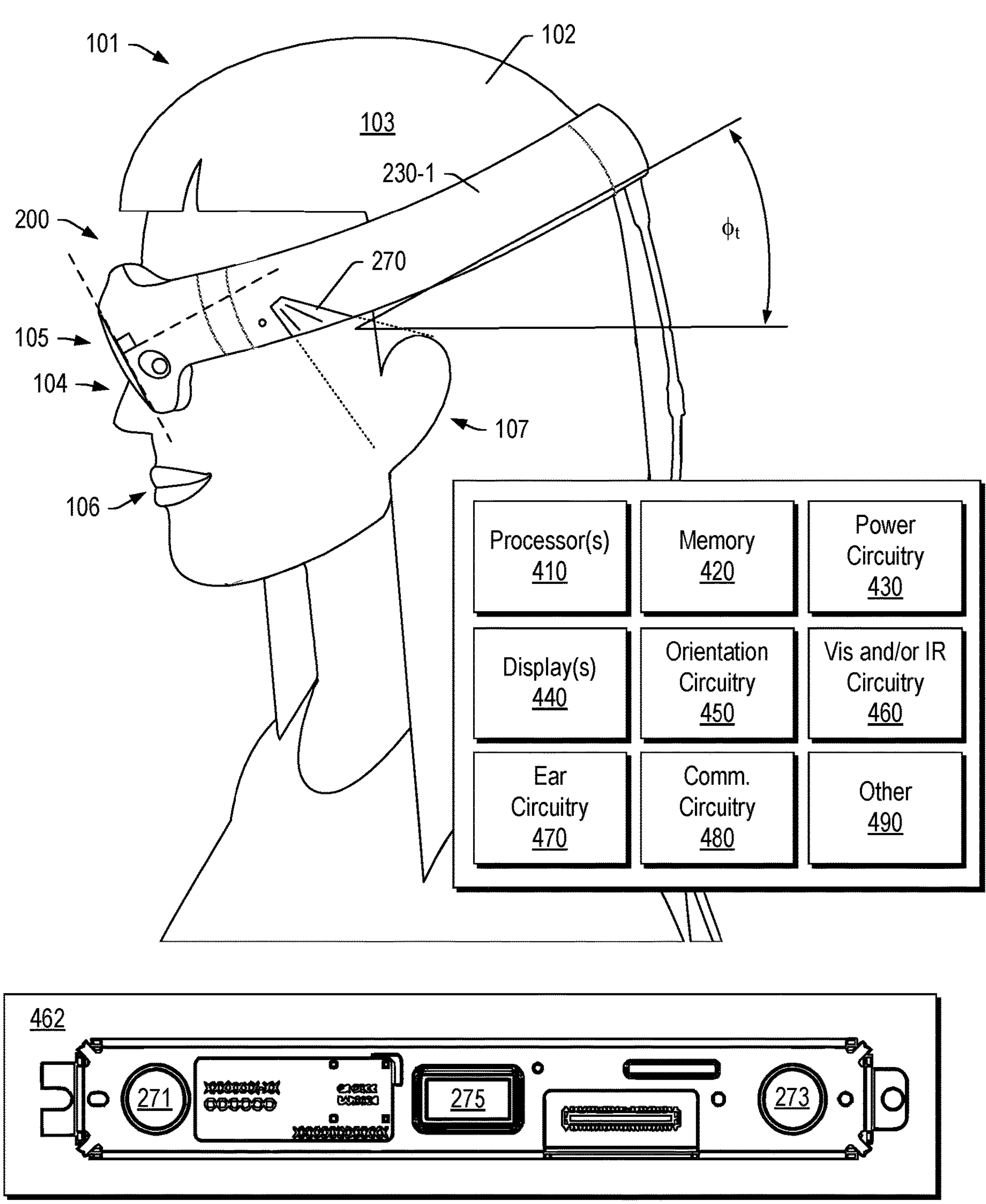
FIG. 4 is a diagram of a user and an example of a headset and examples of circuitry.

FIG. 4 shows an example of the user 101 (e.g., a user) that has hair 103 on her head 102, a nose 104, eyes 105, a mouth 106 and a left ear 107 (e.g., consider the user 101 as having right and left ears) where the user 101 is wearing the headset 200. In the example of FIG. 4, the ears 107 may or may not be involved in fit; whereas, one or more pads, a nosepiece, temples, a joiner, a band, a strap or straps may be involved in fit, where one or more of such features may be adjustable.

As shown in the example of FIG. 4, the sensor 270 can be a left ear sensor that has a FOV that includes the left ear 107 of the user 101. As shown, the sensor 270 can be aimed in a particular direction which is generally downwardly and toward the back side of the user 101. In such an example, the sensor 270 is positioned slightly in front of the left ear 107, noting that a sensor may be positioned in a manner over a portion of an ear.

In eyeglasses, an angle of side or side angle is defined in BS 3521: Part 2: 1991 as the vertical angle between a normal to the back plane of the front and the line of the side when opened. Another angle is the pantoscopic angle or pantoscopic tilt, which is related to the angle of side. Pantoscopic tilt is defined as a lens tilt about the horizontal axis, with respect to primary gaze of a subject. Simplistically, it can be explained as the rotation of lens bottom towards the cheeks. Pantoscopic tilt for eyeglasses may range, for example, from 0 degrees to 15 degrees where tilt of 3 degrees to 7 degrees may be considered normal.

In FIG. 4, an angle $\phi_t$ is shown with respect to horizontal, which may approximate a pantoscopic tilt (e.g., pantoscopic angle or pantoscopic tilt angle). For example, consider a dashed line that is approximately normal to a plane of an eyepiece. As an example, a pantoscopic tilt for a headset can differ from that of eyeglasses with prescription lenses. Such a difference can be in range, which may be due in part to positioning of one or more displays in the headset.

Om the example of FIG. 4, the sensor 270 may include a FOV that can accommodate a range of pantoscopic tilt angles for a number of different users. In general, the angle is greater than 0 degrees (e.g., tilted upwardly away from horizontal toward vertical, with vertical being 90 degrees). In such an approach, the sensor 270 can be positioned, optionally integrally, to assure that a FOV of the sensor 270 can sense at least a portion of the ear 107 of the user 101. In the example of FIG. 4, as the temple 230-1 rises upwardly away from the ear 107, the sensor 270 can have an adequate view of the ear 107.

In the example of FIG. 4, the headset 200 can include one or more of various types of circuitry, which can include one or more processors 410, memory 420 accessible to at least one of the one or more processors 410, power circuitry 430, one or more displays 440, orientation circuitry 450, visible and/or infrared (IR) circuitry 460 (e.g., as locating circuitry, etc.), ear circuitry 470, communication circuitry 480 and optionally one or more other types of circuitry 490.

In the example of FIG. 4, the ear circuitry 470 can be operatively coupled to the sensor 270 or the sensors 270-1 and 270-2 for purposes of ear biometric analysis, which can provide for identification, authentication, etc. As mentioned, one or more ear biometrics may be utilized for one or more purposes, which can include identification, authentication and/or one or more other purposes (e.g., terminating a session, fit adjustment, etc.). As an example, a sensor may provide for recognition of one or more earrings, one or more ear bands, one or more tattoos, etc. In such an example, one or more pieces or jewelry, body art, etc., may be recognized and utilized for identification, security, etc. As an example, where a user is not wearing a usual piece of jewelry, circuitry may issue a notification to a user (e.g., via a display, a speaker, etc.), which the user may confirm or deny (e.g., as part of security protocol, etc.). As an example, a sensor may provide for letting a user know when a bug (e.g., a fly, a bee, etc.) is on or near the user's ear. As an example, where a head wearable device includes a projector that can project onto an ear, such a projector may be activated in an effort to keep the bug away from the user's ear. As an example, the ear circuitry 470 can be operatively coupled to a projector (e.g., projection circuitry). As an example, the sensor 270 as shown in the example of FIG. 4 can be installed with a projector such that a substantially common field (e.g., field of view and field of projection) is provided for the sensor 270 and the projector (e.g., consider side-by-side components).

FIG. 4 shows an example of circuitry 462 that can include one or more cameras 271 and 273 and a projector 275 (e.g., an ear illumination source, etc.). Such circuitry may include one or more features of the REALSENSE technology. For example, consider one or more features of a stereo depth module (e.g., D410, D415, D430, etc.). As an example, the cameras 271 and 273 can provide for stereoscopic machine vision where the projector 275 may be an infrared (IR) projector that can improve the ability of the cameras 271 and 273 to determine depth by projecting an infrared pattern onto an ear, which may increase texture. As an example, for purposes of ear sensing, a pattern may be tailored with respect to the human ear such that the pattern can increase recognition of particular features that may tend to be unique to an individual to thereby increase recognition accuracy. For example, consider a pattern that can be projected onto an ear antihelix region where the ear triangularis is defined, where the spina helicis is defined and/or where the concha is defined (e.g., cymba and cavum). As an example, the circuitry 462 can be operatively coupled to a processor such as, for example, a vision processor (e.g., consider the D4 card of the REALSENSE technology).

As an example, one or more sensors may be arranged with respect to a head wearable device to provide a FOV of at least a portion of a human ear. As mentioned, a projector or projectors may be utilized as part of a sensor system.

As an example, the one or more displays 440 may include two OLED displays with a combined resolution in excess of 1000×600, with a suitable refresh rate in excess of approximately 30 Hz. As an example, the orientation circuitry 450 can include one or more types of circuitry that may reference external objects in an environment and may include one or more of an accelerometer, a gyroscope, and a magnetometer that may provide orientation data. As an example, the visible and/or IR circuitry 460 can include one or more IR emitters, one or more IR detectors, one or more visible wavelength detectors, etc. As an example, motion circuitry can be included that includes one or more types of circuitry such as, for example, one or more of an accelerometer, a gyroscope, and a magnetometer, which may provide motion data and/or orientation data (e.g., as part of the orientation circuitry 450, etc.). As an example, various types of circuitry may be integrated for one or more purposes, for example, consider orientation, visible and/or IR, and motion circuitry being integrated for one or more types of fit associated functionalities, which may facilitate ear sensing, etc.

As an example, the headset 200 can include audio circuitry that can include one or more speakers (e.g., earphone speakers) and/or one or more wireless transmitters (e.g., BLUETOOTH, etc.). As an example, the sensor 270 may be collocated with one or more speakers as both may be aimed at an ear. For example, consider a module that includes a camera and a speaker where the module can be carried by the temple 230-1 with the camera and the speaker directed at the ear 107 of the user 101.

As an example, a headset can include circuitry such as a TOSHIBA TC358870XBG 4K HDMI to MIPI dual-DSI converter, a CYPRESS CYUSB3304 USB 3.0 hub controller, a ST MICROELECTRONICS STM32F072VB ARM CORTEX-MO 32-bit RISC core microcontroller, a WINBOND W25Q64FVIG 64 Mb serial flash memory, a NORDIC SEMICONDUCTOR nRF51822 BLUETOOTH smart and 2.4 GHz system on a chip (SoC), a CMEDIA CM119BN USB audio controller, a BOSCH SENSORTEC BMI055 6-axis inertial sensor, multiple TEXAS INSTRUMENTS TLC59401 16-channel LED driver with dot correction and grayscale PWM control, etc.

As an example, a headset can include one or more of a QUALCOMM SNAPDRAGON processor, SK HYNIX SRAM, a heat sink, a battery such as, for example, an 18650 battery format 2600 mAh battery, a microphone, an antenna, etc. As to the 18650 battery format, it can be approximately 65 mm (2.56 in) long or may be approximately 68 mm (2.68 in) long with an internal protection circuit (e.g., longer than an AA format battery).

As an example, a headset can include one or more features of the OCULUS GO headset. As an example, a headset can include a QUALCOMM SNAPDRAGON 821 SoC, 3 GB of LPDDR4 RAM, 32 GB or more of internal storage, an integrated ADRENO 530 GPU (e.g., approximately 500 GFLOPS of graphics performance), a 2600 mAh battery, non-positional three-degrees of freedom tracking, one or more proximity sensors, an accessory controller, a 5.5-inch LCD display with a 2560×1440 (1280×1440 pixels per eye) resolution in an RGB-stripe subpixel arrangement, a field of view of approximately 100 degrees (e.g., a horizontal pixel density of approximately 12.67 pixels per degree), and Fresnel lenses.

As an example, a headset can include one or more features of the MAGIC LEAP headset. For example, consider one or more of a NVIDIA TEGRA X2 SoC with two DENVER 2.0 64-bit cores and four ARM CORTEX A57 64-bit cores, an integrated Pascal-based GPU with 256 CUDA cores, 8 GB RAM, 128 GB onboard storage, BLUETOOTH 4.2, Wi-Fi 802.11ac/b/g/n, a USB-C connector, a 3.5 mm headphone jack, etc. The MAGIC LEAP headset includes an OMNIVISION OP02222 field-sequential color (FSC) LCOS device (e.g., customized variation of the OMNIVISION OP02220) that is an optical system for injecting images into the waveguides. The MAGIC LEAP headset includes a cast magnesium block that holds optics and sensors.

As to sizing, the MAGIC LEAP headset is available in two sizes, Size 1 and Size 2. The wearer's interpupillary distance (IPD) can be utilized to help select Size 1 or Size 2 where an IPD less than 65 mm corresponds to Size 1 and equal to or greater than 65 mm corresponds to Size 2. For the MAGIC LEAP headset, approximately 65 to 75 percent purchase Size 1, which is recommended if the headset is to be shared (e.g., multiple different wearers).

As explained above with respect to FIG. 3C, the box center distance (BCD) may be referred to as the frame PD, which may be an approximate interpupillary distance (IPD) (e.g., frame interpupillary distance, frame PD).

As to dimensions of a headset, consider, as an example, dimensions of approximately 190 mm×105 mm×115 mm (7.48 in×4.13 in×4.53 in) and, for example, a mass of approximately 468 g (1.032 lb) (e.g., OCULUS headset).

As an example, a headset may include one or more features of one of the MAD GAZE headsets such as, for example, consider one or more of the VADER headset, the ARES headset, the X5 headset, the X5S headset and the GLOW headset. The VADER headset includes dual lenses with a field of view of 45 degrees, an ANDROID OS, 3 GB of RAM, 32 GB of storage, an 8MP camera, Wi-Fi, GPS, GLONASS, accelerometers, gyroscopes, an ambient light sensor and the equivalent of a 1280×720 90-inch display within three meters of a user's face.

Some other examples of headsets include the MICROSOFT HOLOLENS headset, the META 2 headset, which works in conjunction with a PC or laptop, and the GOOGLE GLASS headset.

Figure 5:
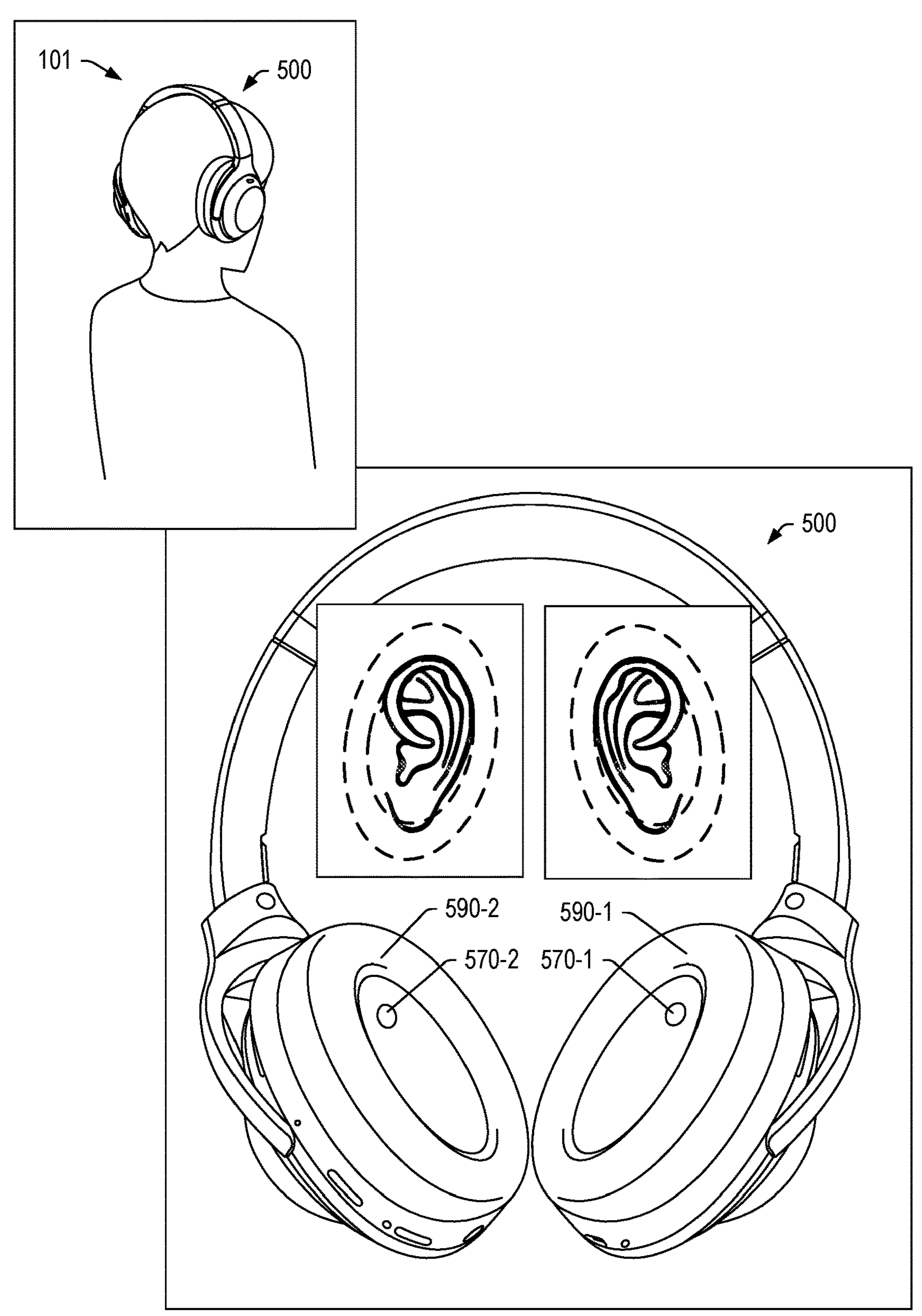
FIG. 5 is a series of diagrams of a user and an example of a head wearable device.

FIG. 5 shows an example of a head wearable device 500 on the user 101 where the head wearable device 500 can be configured as headphones with sensors 570-1 and 570-2 and ear cushions 590-1 and 590-2. In such an example, the sensors 570-1 and 570-2 can sense one or more ear features, which may be processed using circuitry of the head wearable device 500. For example, consider identifying the user 101, authenticating the user 101, etc. As an example, upon identification of the user 101, circuitry of the head wearable device 500 may implement settings that are tailored to and/or set by the user 101. In such an approach, the head wearable device 500 may be utilized by multiple users where, for example, a data structure is stored in memory of the head wearable device 500 to associate a user (e.g., via a user ID, etc.) and particular settings.

As an example, one or both of the ear cushions 590-1 and 590-2 can include sensor circuitry. For example, consider contact sensing circuitry that can determine a region of contact (e.g., a contact pattern, etc.) between a cushion and an ear of a user. In such an example, the contact sensing circuitry may utilize an array such as a capacitive array that can digital a region or regions of contact, which may be analyzed. As an example, the head wearable device 500 can include the sensors 570-1 and 570-2 and/or contact sensing circuitry integrated into the ear cushions 590-1 and 590-2. As an example, a combination of sensed information may be utilized for purposes of adequate positioning (e.g., for listening, sensor FOV, etc.), identification, authentication, etc.

As to contact sensing circuitry, FIG. 5 shows examples of left and right ears with concentric closed curves, which may represent contact sensing surfaces of the ear cushions 590-1 and 590-2. As shown, contact occurs between each of the ears and a respective one of the ear cushions 590-1 and 590-2. In such an example, contact locations may be utilized alone or in combination with information sensed by one or both of the sensors 570-1 and 570-2. For example, consider combining information to more accurately locate and identify features of an ear.

Figure 6:
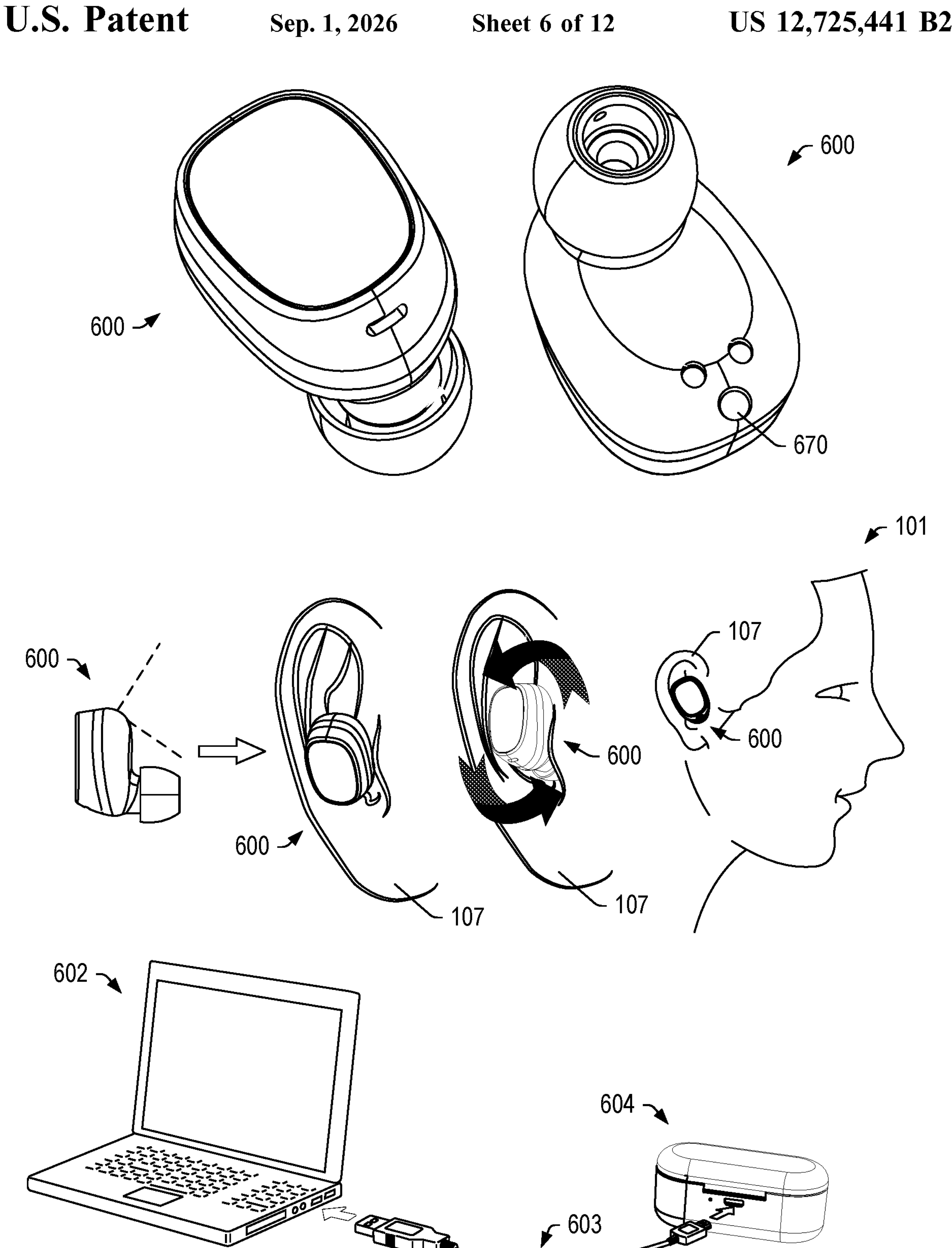
FIG. 6 is a series of diagrams of an example of a user and examples of equipment.

FIG. 6 shows an example of a head wearable device 600, which may be provided as a right head wearable device and a left head wearable device. In the example of FIG. 6, the head wearable device 600 can be configured as an earbud that includes an extension that is to be inserted into a portion of an ear.

As shown in the example of FIG. 6, the head wearable device 600 can include a sensor 670 that can sense one or more features of the ear 107 of the user 101. In such an example, the user 101 may bring the head wearable device 600 close to his ear where the sensor 670 can acquire ear information. As the user 101 inserts the head wearable device 600, the sensor 670 may continue to acquire ear information. And, once inserted, the sensory 670 may continue to acquire ear information (e.g., continuously, periodically, etc.). In such an example, the acquired ear information (e.g., sensed information, etc.) may be utilized for one or more purposes, which can include identification of the user, authentication, etc.

As shown in the example of FIG. 6, the head wearable device 600 can be provided with a case 604, which may be suitable for storing a left instance and a right instance of the head wearable device 600. As shown, the case 604 may be electrically coupled to a computing device 602, for example, via a cable 603. In such an example, power and/or data may be transferred (e.g., uni-directionally and/or bi-directionally). As an example, the computing device 602 can include one or more applications that can be utilized to control one or more ear related features. For example, consider downloading ear sensed data to the computing device 602 where a model can be generated for subsequent uploading to the head wearable device 600. In such an example, the model may be a lightweight model that allows the head wearable device 600 to perform identification and/or authentication using its own circuitry.

As an example, the head wearable device 600 can include wireless circuitry such as, for example, BLUETOOTH circuitry. In such an example, an ear identification and/or authentication method may provide for establishing a wireless network connection, which may be a secure connection (e.g., encrypted, etc.). In such an approach, the user 101 may be able to communicate in a secure manner (e.g., via wireless circuitry, etc.) or listen to secure audio content. As an example, upon removable of the head wearable device 500 from the ear 107 of the user 101, a secure communication session (e.g., link, etc.) may be terminated. For example, the sensor 670 can provide sensed information that indicates that the head wearable device 600 is no longer in the ear 107 of the user 101.

As to a communication link or session, consider the head wearable device 600 as being able to connect wirelessly to a phone via BLUETOOTH circuitry where the cell phone connects wirelessly to a network via other circuitry (e.g., cellular, satellite, etc.). In such an example, a chain of trust may be established between the head wearable device and the phone. As an example, sensed ear information (e.g., sensed feature data of a human ear) may be utilized to access the phone (e.g., as a login to the phone). For example, an initial BLUETOOTH session may be established that is limited for purposes of logging into the phone via sensed ear information as sensed by the sensor 670 of the head wearable device 600.

As an example, the computing device 602 may include one or more imaging components such as one or more components of the REALSENSE technology. In such an example, a user may be instructed to image her ear or ears using the computing device 602 where the computing device 602 can generate a model for use by the head wearable device 600. In such an example, the model may be a 1D model, a 2D model, a 3D model, etc., that is suitable for use with sensed feature data of the sensor 670.

Figure 7:
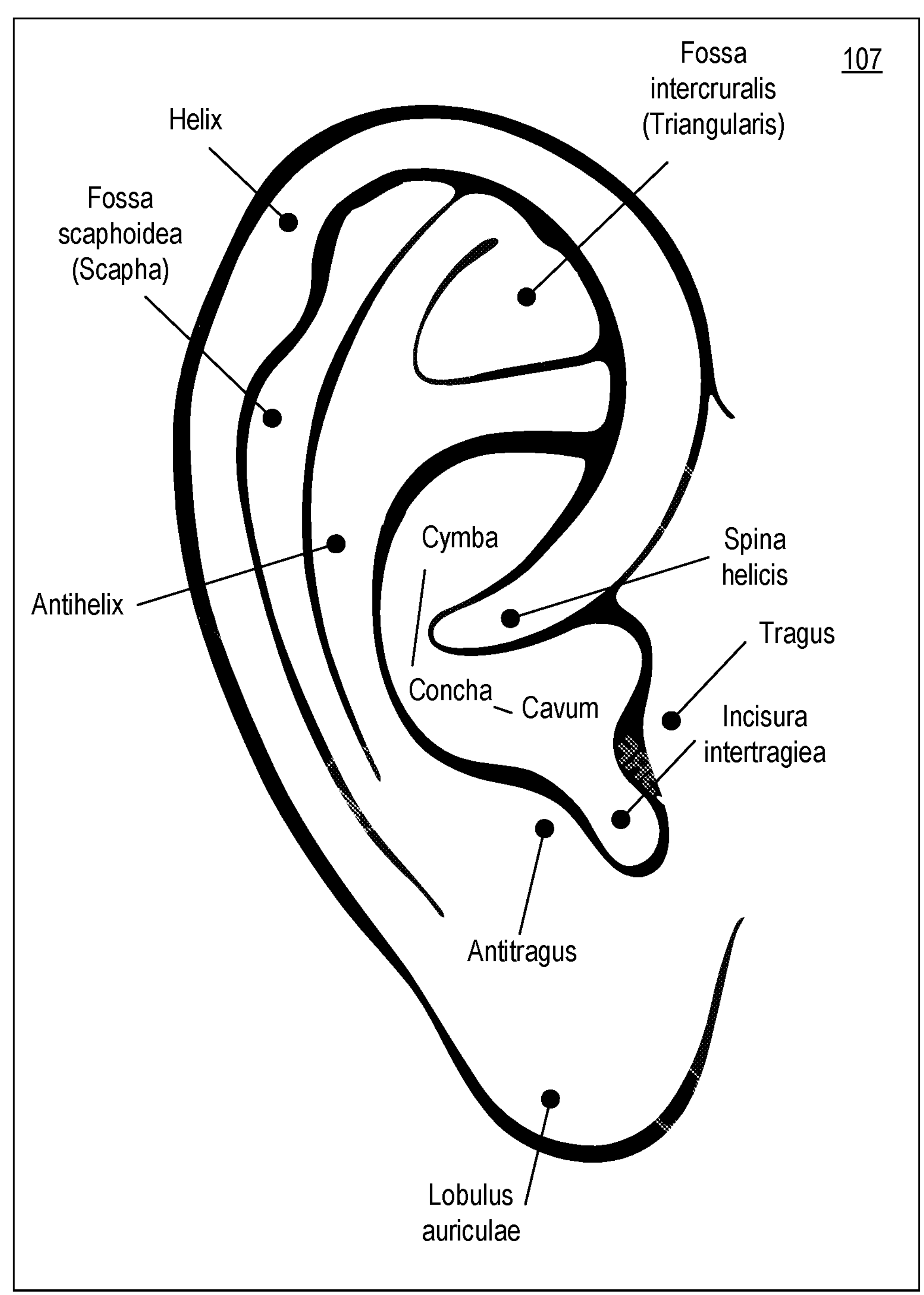
FIG. 7 is a diagram of an example of a human ear.

FIG. 7 shows anatomy of the ear 107, as including various features where one or more of such features may be utilized for one or more purposes (e.g., identification, authentication, etc.).

The external ear consists of the expanded portion named the auricula or pinna, and the external acoustic meatus. The former projects from the side of the head and serves to collect the vibrations of the air by which sound is produced; the latter leads inward from the bottom of the auricula and conducts the vibrations to the tympanic cavity. The auricula or pinna is of an ovoid form, with its larger end directed upward. Its lateral surface is irregularly concave, directed slightly forward, and presents numerous eminences and depressions to which names have been assigned. The prominent rim of the auricula is called the helix; where the helix turns downward behind, a small tubercle, the auricular tubercle of Darwin, is frequently seen. Another curved prominence, parallel with and in front of the helix, is called the antihelix; this divides above into two crura, between which is a triangular depression, the fossa triangularis. The narrow-curved depression between the helix and the antihelix is called the scapha; the antihelix describes a curve around a deep, capacious cavity, the concha, which is partially divided into two parts by the crus or commencement of the helix; the upper part is termed the cymba conch, the lower part the cavum conch. In front of the concha, and projecting backward over the meatus, is a small pointed eminence, the tragus. Opposite the tragus, and separated from it by the intertragic notch, is a small tubercle, the antitragus. Below this is the lobule, composed of tough areolar and adipose tissues, and wanting the firmness and elasticity of the rest of the auricula.

One or more of various techniques may be utilized to analyze sensed information of an ear or ears. An article by Cummings et al., A Novel Ray Analogy for Enrolment of Ear Biometrics, 2010 Fourth IEEE International Conference on Biometrics: Theory, Applications and Systems (BTAS), 27-29 Sep. 2010, is incorporated by reference herein. An article by Yan and Bowyer, Biometric Recognition Using 3D Ear Shape, IEEE Transactions on Pattern Analysis and Machine Intelligence, Vol. 29, No. 8, August 2007, is incorporated by reference herein. An article by Chang et al., Comparison and Combination of Ear and Face Images in Appearance-Based Biometrics, October 2003, IEEE Transactions on Pattern Analysis and Machine Intelligence 25(9): 1160-1165, is incorporated by reference herein.

In the article by Cummings et al., ear imagery was normalized for position, scale and rotation and then an image ray transform, based upon an analogy to light rays was applied, where the transform highlighted tubular structures such as the helix of the ear. Cummings et al. applied a technique that exploits the elliptical shape of the helix for enrolment for ear biometrics to achieve 99.6 percent success at enrolment across 252 images of the XM2VTS database.

In the article by Yan and Bowyer, an approach for ear biometrics included automated segmentation of the ear in a profile view image and 3D shape matching for recognition to achieve a rank-one recognition rate of 97.8 percent for an identification scenario and an equal error rate of 1.2 percent for a verification scenario on a database of 415 subjects and 1,386 total probes.

In the article by Chang et al., a principal component analysis approach is described along with approaches for control for relative quality of face and ear images. In Chang et al., recognition performance was not significantly different between the face and the ear; noting that multimodal recognition using both the ear and face resulted in statistically significant improvement over either individual biometric.

Figure 8:
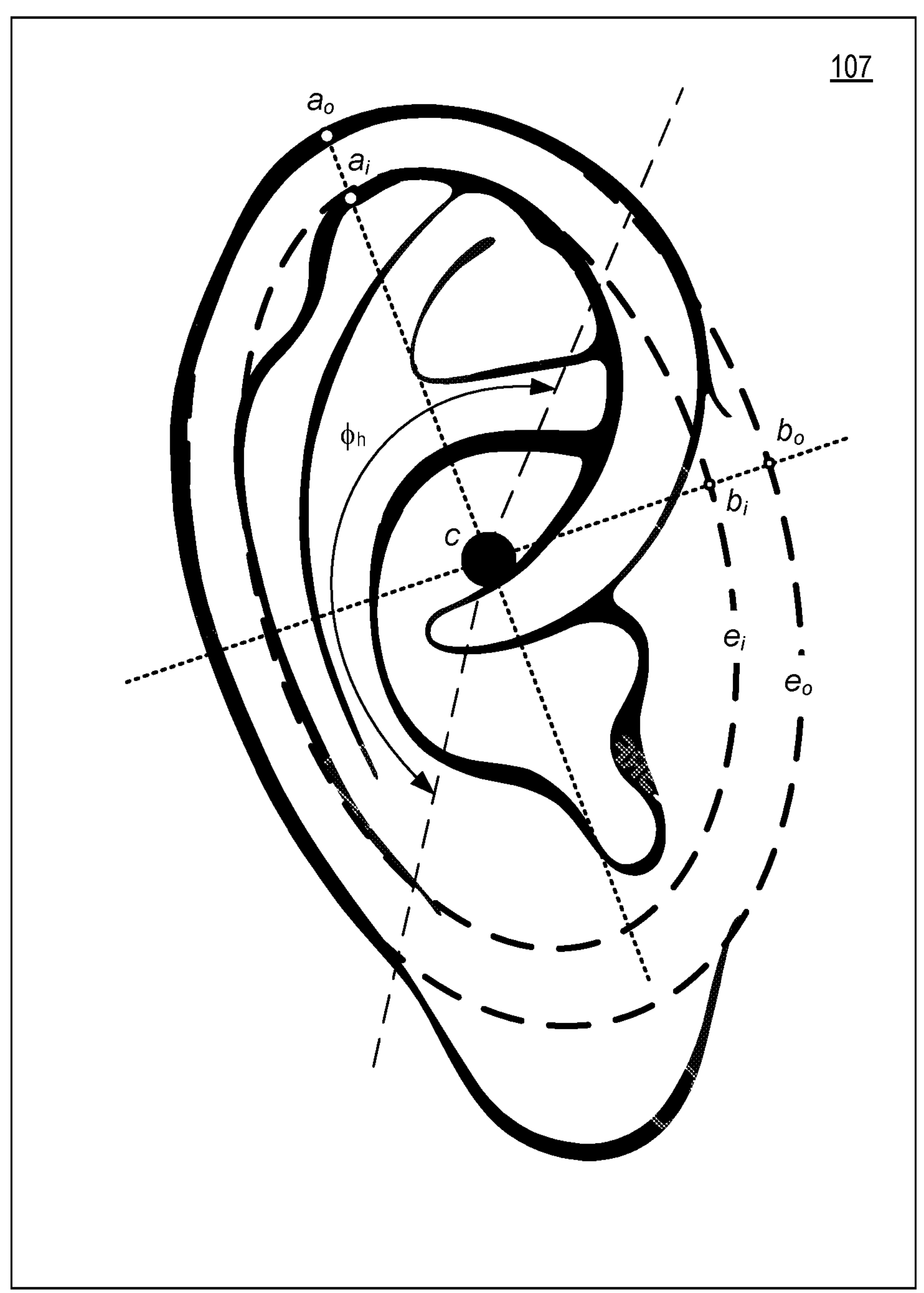
FIG. 8 is a diagram of the human ear of FIG. 7 and example curves.

FIG. 8 shows an example of the ear 107 with examples of fit ellipses ($e_i$ and $e_o$) on a common center (c). As an example, a method can include analyzing sensed ear information (e.g., sensed feature data of a human ear) using one or more contour shapes, which can include, for example, an ellipse with the ear pit as a center of the ellipse. In such an example, major axis and minor axis dimensions may be determined. For example, consider the major axis as being approximately 15 mm and the minor axis as being approximately 10 mm. As an example, a major axis may be defined via a tilt angle, which may be referenced with respect to vertical (e.g., gravity) and/or a minor axis may be defined via a tilt angle, which may be referenced with respect to horizontal (e.g., 90 degrees from a direction of gravity). As an example, circuitry may provide for sensing of a direction of the acceleration of gravity for purposes of analyzing one or more features of an ear and/or position of a head of a user.

As to an ellipse, consider an equation as follows:

$$\frac{x^2}{a^2} + \frac{y^2}{b^2} = 1$$

where a 2D x, y coordinate system is utilized along with parameters of half width and half height, a and b, respectively (e.g., semi-major axis and semi-minor axis distances from center to ellipse).

The foregoing equation can be centered at an origin, noting that a transform may be utilized to compare the origin to one or more other coordinate systems, positions, locations, etc. As shown in the example of FIG. 8, the inner ellipse and the outer ellipse ($e_i$ and $e_o$) can be defined via semi-major axis distances ($a_i$ and $a_o$) and semi-minor axis distances ($b_i$ and $b_o$). FIG. 8 also shows an angle $\phi_h$ as an angular span of the ear helix where the ear helix has an approximately constant dimension (e.g., consider a difference between $a_i$ and $a_o$ and a difference between $b_i$ and $b_o$ as being approximately equal. As an example, a recognition technique may utilize one or more features to recognize an ear of an individual, for example, such an approach may provide for determining a helix dimension of the ear helix and/or an extent of the ear helix.

As an example, the ear helix may provide for locating one or more other features of an ear. For example, once the ear helix is recognized, one or more other features may be referenced with respect to the ear helix (e.g., antihelix, etc.). As an example, a tiered approach to recognition may be utilized (e.g., progressing from more readily recognized features to features that can be more readily recognized using one or more of the more readily recognized features, etc.).

As explained, an ellipse can include a minor axis and a major axis, along with a center, vertexes, co-vertexes, foci, linear eccentricities, etc. An ellipse may be analyzed as being a shape that is formed by cutting a cone with a plane (e.g., an inclined plane). As an example, a portion of an ellipse or another geometric model may be utilized. For example, consider half of an ellipse, etc.

As an example, an analysis may include utilizing a 1D, a 2D and/or a 3D spatial coordinate system. A multidimensional coordinate system may be utilized, which may be planar or define one or more planes where a plane may be fixed and/or dynamic. As an example, a headset may store data such that one or more templates (e.g., one or more models) may be generated for recall and use in identifying a user, etc.

As an example, a method may include analyzing sensed ear information utilizing a plurality of shapes such as, for example, a plurality of ellipses. For example, in FIG. 8, the two ellipses can be spaced apart by a distance that may represent a dimension of the helix of the ear 107.

As explained, one or more ML models may be implemented for purposes of ear recognition. For example, consider a trained ML model that can classify various features where each of the classified features can be compared to a stored feature where upon sufficient match between classified and stored features, a user may be identified (e.g., the user's ear recognized). In such an example, the features can include, for example, one or more of the features shown and/or described with respect to the example of FIG. 7, the example of FIG. 8, etc.

As an example, a method can include analyzing bilateral symmetry. For example, consider a method that includes matching a mirrored left ear to a right ear. As an example, a method may include enrolling a right ear and trying to recognize it using mirrored left ear. As an example, a method can include making one or more comparisons between ears, etc.

As to types of machine learning (ML) models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network (CNN), stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a ML model such as the sequential model of the TENSORFLOW framework can be utilized, which includes three convolution blocks (tf.keras.layers.Conv2D) with a max pooling layer (tf.keras.layers.MaxPooling2D) in each of them. The sequential model includes a fully-connected layer (tf.keras.layers.Dense) with 128 units on top of it that is activated by a ReLU activation function ('relu'). Such a ML model may be trained using training data and tested using test data, for example, to generate a trained ML model that can classify features of an ear, recognize an ear, etc. As mentioned, the TENSORFLOW LITE framework may be utilized. For example, consider the Mobilenet_V1_1.0_224 model, which accepts an input of 224×224 pixels and three color channels per pixel (red, green, and blue). As an example, one or more sensors may provide for color sensing of a human ear using one or more types of color models (e.g., RGB, etc.). In such an example, color or colors may be a feature or features of a human ear. As an example, imagery can be in a pixel format where each pixel can have one or more channels (e.g., grayscale, RGB, etc.). As an example, circuitry of a head wearable device may provide for analysis of sensed feature data of an ear using one or more channels. As an example, where depth sensing is provided, a depth channel may be utilized.

As an example, a head wearable device can include circuitry that can assess ear color, which can vary from individual to individual and, for some individuals, may vary depending on factors such as sun exposure, temperature, emotional state, etc. As to a condition that may be referred to as "red ears", it can be a result of flushing or blushing where flushing is an emotional reaction, resulting in blood vessels opening wider in certain areas because of a signal in the nervous system. One or more other triggers of red ears may include hormones, food, alcohol, medications, exercise, changes in temperature, and medical conditions.

As an example, a head wearable device can provide for detection of a condition such as red ears. For example, consider a head wearable device that can be utilized to display content to a user where viewing the content may prompt a reaction. In such an example, one or more sensors may capture the reaction and record it and/or take other action. For example, consider an ability to reduce the likely impact of content being rendered, which may be for purposes of reducing effect on a user's emotional state. As to a gaming scenario, consider adjusting content according to one or more rating systems (e.g., G, PG, PG13, R, etc.). In such an example, if a head wearable device senses a change in ear color to a redder ear color (e.g., consider utilization of a red channel, etc.), a game may be automatically adjusted in an effort to reduce such arousal of the user. As an example, where use arousal is expected and not detected, a game may be automatically adjusted in an effort to increase arousal of the user. As explained, data as to one or more ears may be sensed for one or more purposes. As an example, consider sensing to identify a user, to select content for the user (e.g., based on identification, etc.) and/or to adjust content responsive to further ear sensing.

As an example, one or more ear-based techniques may be combined with one or more other techniques. For example, consider eye-based being used in combination with ear-based (e.g., for identification, authentication, content selection, content adjustment, etc.).

Figure 9:
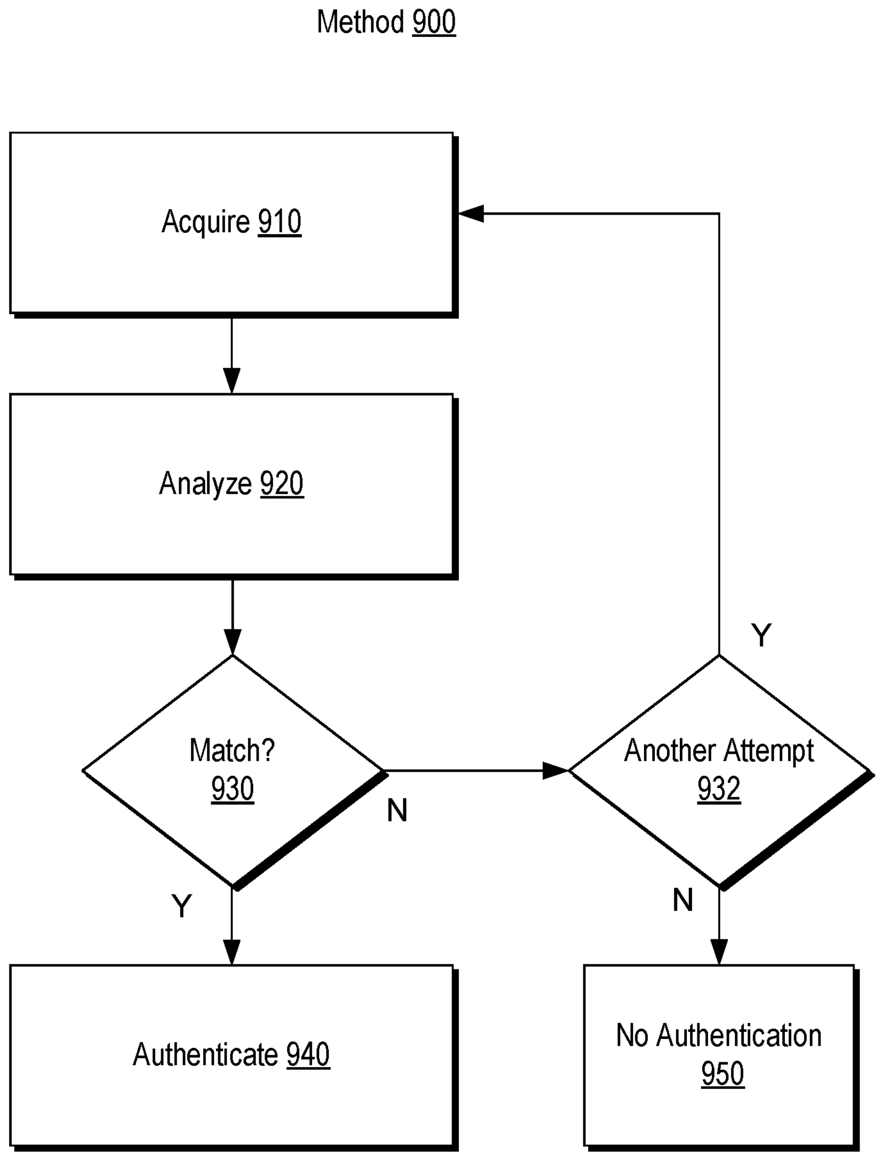
FIG. 9 is a diagram of an example of a method.

FIG. 9 shows an example of a method 900 that includes an acquisition block 910 for acquiring ear information of a user via one or more sensors, an analysis block 920 for analyzing at least a portion of the acquired ear information, a decision block 930 for deciding whether a match exists with respect to known ear information, and an authentication block 940 that, where a match exists, authentication can occur for the user. As shown in the example of FIG. 9, where an acceptable match does not exist per the decision block 930, the method 900 may continue to another decision block 932 that decides whether another attempt is appropriate where, if so, the method 900 can continue to the acquisition block 910. In the instance that another attempt is not appropriate (e.g., a time out, an attempt limit, etc.), the method 900 can continue to a no authentication block 950.

In the example of FIG. 9, the analysis block 920 may utilize one or more techniques for analyzing at least a portion of the acquired ear information. As explained, one or more of the techniques of the article of Cummings et al., the article of Pan and Bowyer, the article of Chang et al., a ML technique, a shape(s) technique, etc., may be utilized.

Figure 10:
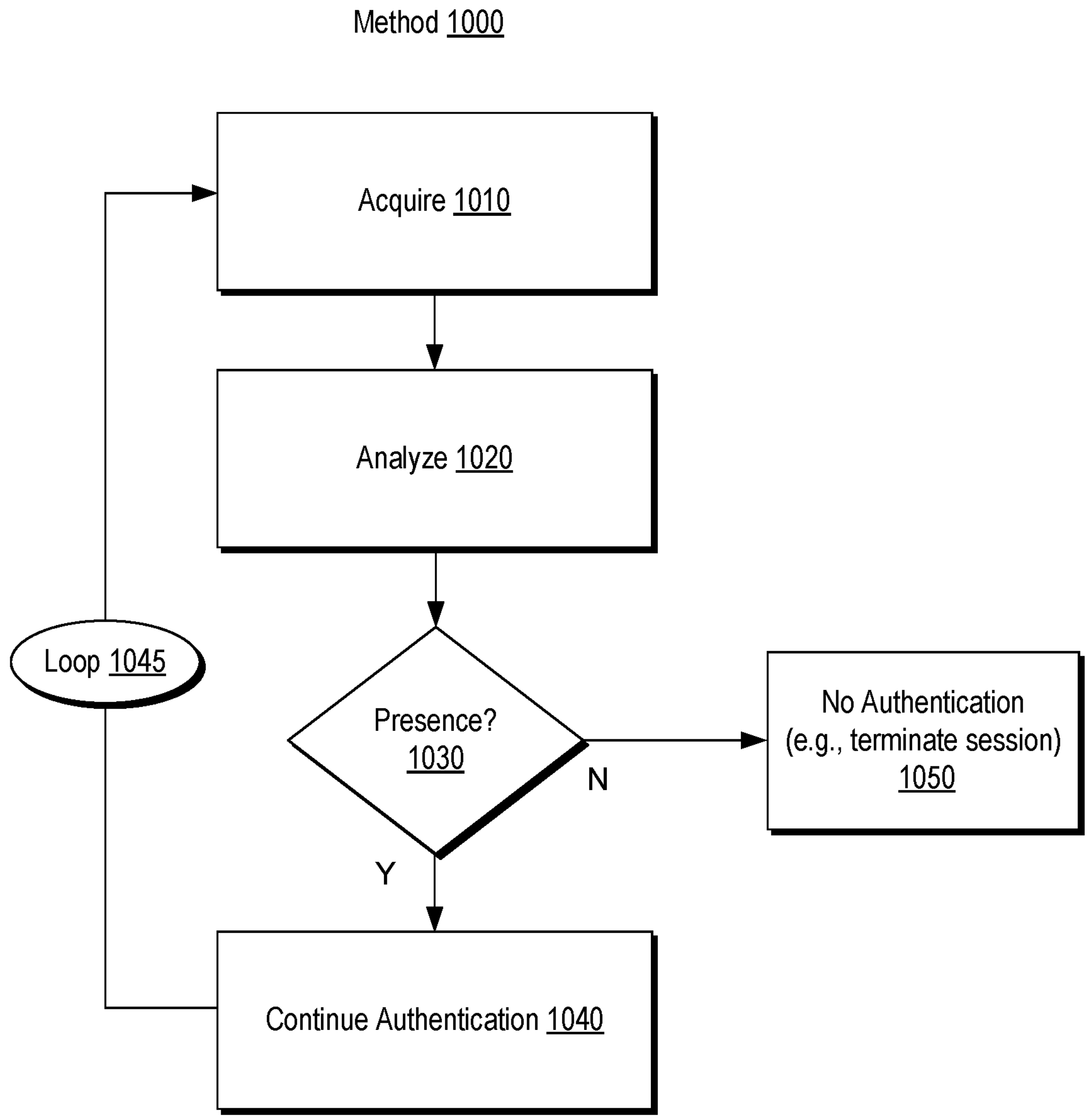
FIG. 10 is a diagram of an example of a method.

FIG. 10 shows an example of a method 1000 that includes an acquisition block 1010 for acquiring sensed ear information, an analysis block 1020 for analyzing at least a portion of the sensed ear information, a decision block 1030 for deciding whether presence exists for a user (e.g., an ear of the user), and a continuation block 1040 for continuing authentication of the user, which may be in a loop 1045 that continues at the acquisition block 1010. As shown, where the decision block 1030 decides that presence no longer exists, the method 1000 can continue to the no authentication block 1050, which may, for example, terminate a session (e.g., an application, a login to an operating system, a connection to another device, a network connection, etc.).

As an example, a headset (e.g., a head wearable device) can be associated with a software development kit (SDK). As an example, a headset can include tracking sensor circuitry, which may include programmable instructions (e.g., firmware, software, etc.). As an example, a headset can include communication circuitry that can be operatively coupled to the Internet, for example, for augmented and/or virtual reality content to be downloaded and rendered. As an example, a SDK can include features for integration of one or more sensed ear features, ear biometric analysis, ear color analysis, ear temperature analysis, etc. As an example, a SDK can include one or more user identification tools, authentication tools, content tools, etc., that utilize one or more sensed ear features.

Figure 11:
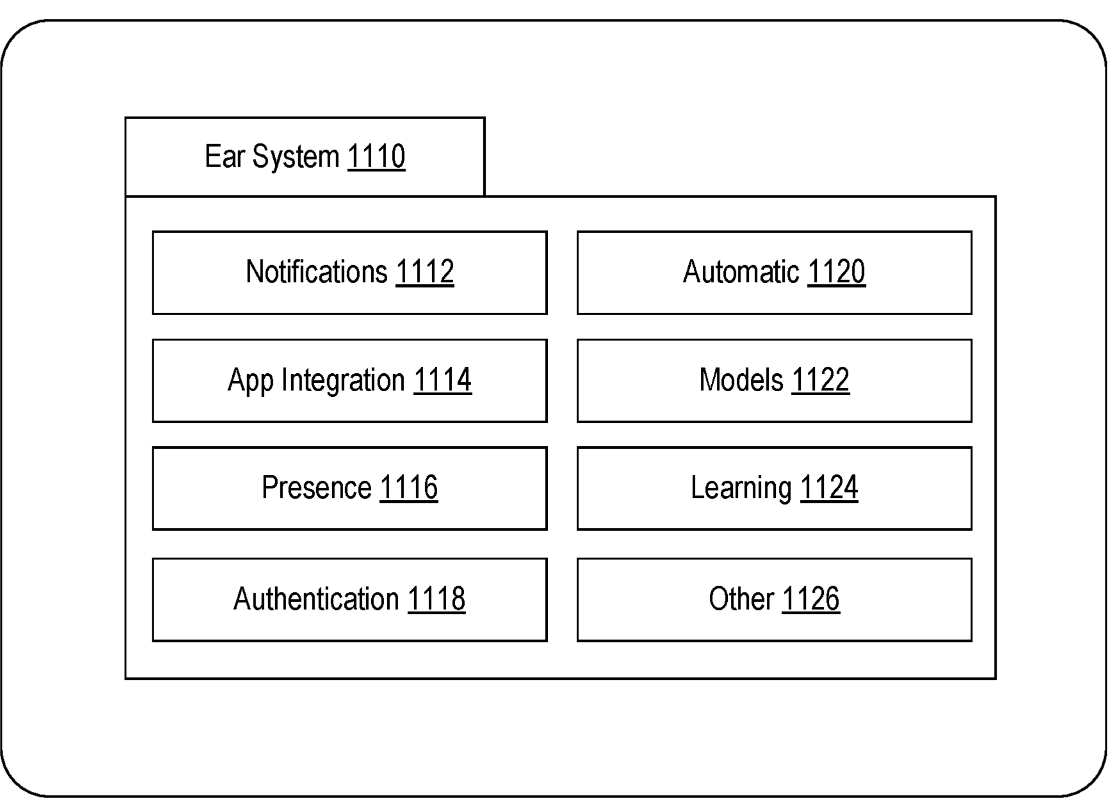
FIG. 11 is a diagram of an example of a graphical user interface.

FIG. 11 shows an example of a graphical user interface (GUI) 1110 that may be rendered using a display assembly of a headset such as the headset 200. As shown, the GUI 1110 may be an ear system GUI that provides for access to various features associated with ear recognition. As shown, various options may exist in such a GUI, including, for example, a notification option 1112, an application (app) integration option 1114, a presence option 1116, an authentication option 1118, an automatic process option 1120, a models option 1122, a learning option 1124 and one or more other options 1126 (e.g., emotion, content, etc.). In such an example, a user may turn on or turn off functionality. As to notifications, these may be set to be visual and/or audible and/or haptic where haptic features are available. As to learning, as an example, one or more machine learning models may be utilized. For example, consider a ML model that can learn that a user has one ear that may be more readily recognized than the other ear. For example, an approach can include assessing both ears of a user and selecting one of the ears for performing ear recognition; noting that, as mentioned, both ears may be utilized.

Figure 12:
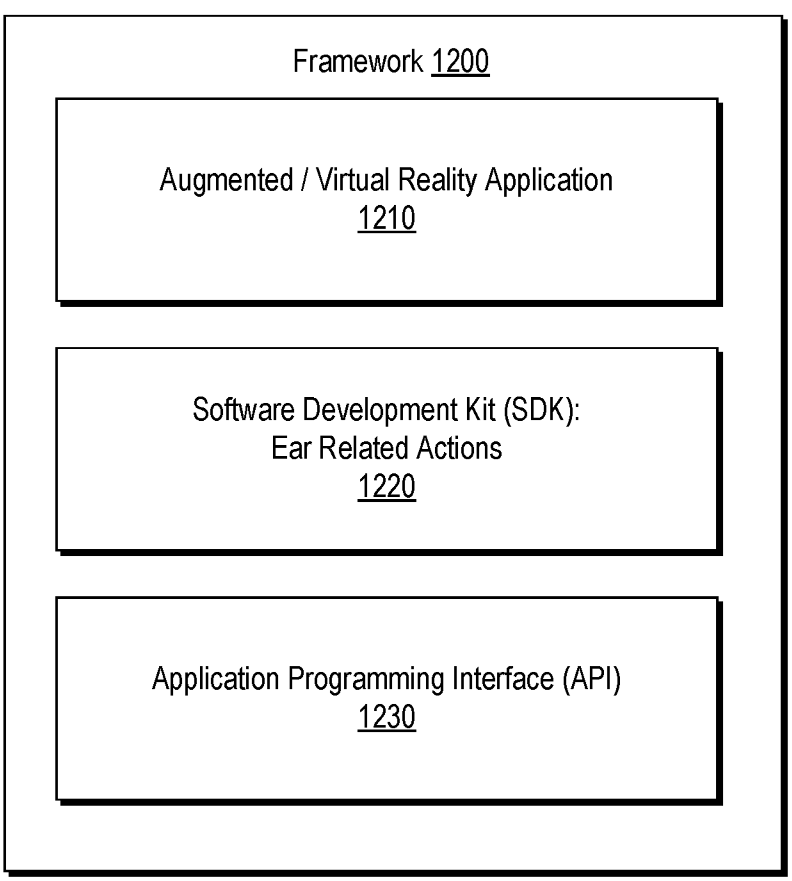
FIG. 12 is a diagram of an example of a framework.

FIG. 12 shows an example of a framework 1200 that includes one or more AR/VR applications 1210, a SDK 1220 for ear related actions, and an API 1230 that may operate with one or more of the AR/VR applications 1210, the SDK 1220, etc., where a user or developer may generate various features involving ear related actions. As explained, ear related actions can include one or more of identification, authentication, detection of emotional condition, content selection and/or adjustment, etc. As an example, a developer of content (e.g., videos, games, etc.) may utilize a framework where such content can be interactive with ear related data. As explained, ears can provide for biometrics and/or other types of information (e.g., emotional condition, etc.). As an example, a head wearable device can include circuitry that may render content that can be commenced, selected, controlled, adjusted, etc., based on one or more types of ear related data.

As an example, a method can include receiving sensed feature data of an ear via a sensor coupled to a head wearable device; comparing at least a portion of the sensed feature data to stored feature data in memory operatively coupled the head wearable device via a processor operatively coupled to the head wearable device; and, based at least in part on the comparing, authenticating an identity of a user of the head wearable device. In such an example, the sensor can be or include an image sensor where, for example, the sensed feature data include image data. In such an example, the image sensor can be or include visible image sensor and/or an infrared (IR) sensor. As an example, an image sensor can have a depth of field (DOF) that is greater than 0.1 cm and less than 100 cm. For example, consider a DOF that does not provide for focused image capture of various objects in a user's environment where such objects are not part of the user's body. Such an approach can provide for enhanced privacy and/or security.

As to an image sensor that is or includes an infrared image sensor, a method can include analyzing at least a portion of the sensed feature data to determine whether the ear is a human ear of the user (e.g., via a heat pattern, etc.). Such an approach may be part of an anti-spoofing technique (e.g., where an artificial ear is presented to a sensor, etc.).

As an example, a sensor can be a contact sensor where, for example, sensed feature data include ear contact pattern data. For example, consider an ear cushion of headphones where the ear cushion can include an integrated contact sensor (e.g., capacitive, etc.). Such a sensor may be akin to a touch-sensitive sensor as utilized in a touch pad, touch-sensitive buttons, etc.

As an example, a method can include utilizing a head wearable device that includes at least one display and rendering information to at least one of the at least one display responsive to authenticating a user based at least in part on sensed feature data (e.g., sensed ear information, etc.).

As an example, a head wearable device can include a frame that includes a left temple and a right temple. In such an example, a sensor can be coupled to one of the left temple and the right temple. As an example, a head wearable device can include a frame that includes a head strap. In such an example, a sensor can be coupled to the head strap.

As an example, a head wearable device can include a first sensor and a second sensor coupled to the head wearable device. In such an example, a method can include receiving sensed feature data of both human ears via the first sensor and the second sensor. In such an example, the comparing can include utilizing at least a portion of the sensed feature data of each of the human ears, which may provide for an increase in authentication accuracy.

As an example, a head wearable device can include at least one headphone. For example, consider the at least one headphone as including a headphone cushion. In such an example, a contact sensor can be coupled to the headphone cushion (e.g., an ear cushion). In such an example, the contact sensor may acquire sensed feature data, which may be in the form of a contact pattern.

As an example, a method can include issuing a signal to illuminate a human ear via an ear illumination source coupled to a head wearable device. In such an example, the method can include, responsive to issuance of the signal, projecting a pattern via the ear illumination source. For example, consider sensed feature data as including patterned ear dimension data. As explained, dots, lines, etc., may be projected onto at least a portion of an ear where imagery may capture features of the ear along with the dots, lines, etc. Such composite imagery may provide for expedited and/or more accurate ear recognition.

As an example, a method can include, after authenticating an identity of a user, receiving additional sensed feature data indicative of absence of a human ear and, responsive to the receiving, issuing a signal. In such an example, where the authenticating the identity of the user initiates a session, the signal can terminate the session.

As an example, a system can include a head wearable device; a sensor coupled to the head wearable device, where the sensor senses feature data of an ear; a processor operatively coupled to the head wearable device; memory operatively coupled to the head wearable device and accessible to the processor; processor-executable instructions stored in the memory and executable to instruct the system to: receive sensed feature data; perform a comparison of at least a portion of the sensed feature data to stored feature data in the memory; and, based at least in part on the comparison, authenticate an identity of a user of the head wearable device.

As an example, a system can include a first sensor and a second sensor coupled to a head wearable device. In such an example, the first and second sensors may be for respective opposing ears (e.g., a left ear and a right ear). As explained, a sensor can be or can include an image sensor.

As an example, a system can include a stem that extends outwardly from a head wearable device where a sensor is coupled to the stem. In such an example, the stem (e.g., an extension) may be an adjustable stem. As an example, a stem can include a stem length that is greater than 0.1 cm and less than 20 cm.

As an example, a system can include a head wearable device that includes a frame and temples and/or a frame and at least one head strap.

As an example, one or more computer-readable storage media can include processor-executable instructions executable to instruct a system to: receive sensed feature data of an ear via a sensor coupled to a head wearable device of the system; perform a comparison of at least a portion of the sensed feature data to stored feature data in memory of the system via a processor of the system; and, based at least in part on the comparison, authenticate an identity of a user of the head wearable device.

In various examples, circuitry may optionally rely on one or more computer-readable media that includes computer-executable instructions. As described herein, a computer-readable medium may be a storage device (e.g., a memory card, a storage disk, etc.) and referred to as a computer-readable storage medium that is non-transitory, not a carrier wave and not a signal.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A head wearable device comprising:
- a head strap or a temple to position the head wearable device on a head of a wearer;
- a sensor coupled to the head strap or the temple, wherein the sensor comprises a field of view that encompass at least a portion of an ear of the wearer to acquire sensed feature data;
- memory that stores feature data;
- anti-spoofing circuitry, operatively coupled to the sensor, that receives at least a portion of the sensed feature data for analysis of one or more of ear heat energy and ear muscle movement that indicate that the ear is not an artificial ear;
- authentication circuitry, operatively coupled to the sensor, that receives and compares at least a portion of the sensed feature data from the sensor to stored feature data in the memory to authenticate an identity of the wearer; and
- termination circuitry, operatively coupled to the anti-spoofing circuitry and the authentication circuitry, that terminates one or more actions of the head wearable device responsive to one or more of spoofing and failure to authenticate.

2. The head wearable device of claim 1, comprising a stem that extends outwardly from the head strap or the temple wherein the sensor is coupled to the stem.

3. The head wearable device of claim 1, comprising a frame, wherein the head strap or the temple is coupled to the frameand temples and wherein the sensor is coupled to one of the temples.

4. The head wearable device of claim 1, wherein the sensor comprises an image sensor and wherein the sensed feature data comprise image data.

5. The head wearable device of claim 4, wherein the image sensor comprises a depth of field that is greater than 0.1 cm and less than 100 cm.

6. The head wearable device of claim 4, wherein the image sensor comprises an infrared image sensor.

7. The head wearable device of claim 1, comprising rendering circuitry that is activated responsive to authentication of the identity of the wearer.

8. The head wearable device of claim 1, comprising an ear illumination source.

9. The head wearable device of claim 8, wherein the ear illumination source projects a pattern and wherein the sensed feature data comprise patterned ear dimension data.

10. A head wearable device comprising:
- a head strap;
- an earphone coupled to the head strap, wherein the earphone comprises a speaker, an ear cushion, and a sensor, wherein the sensor comprises a field of view that encompass at least a portion of an ear of a wearer to acquire sensed feature data;
- memory that stores feature data;
- anti-spoofing circuitry, operatively coupled to the sensor, that receives at least a portion of the sensed feature data for analysis of one or more of ear heat energy and ear muscle movement that indicate that the ear is not an artificial ear;
- authentication circuitry, operatively coupled to the sensor, that receives and compares at least a portion of the sensed feature data from the sensor to stored feature data in the memory to authenticate an identity of the wearer; and
- termination circuitry, operatively coupled to the anti-spoofing circuitry and the authentication circuitry, that terminates one or more actions of the head wearable device responsive to one or more of spoofing and failure to authenticate.

11. The head wearable device of claim 10, wherein the sensor comprises a contact sensor and wherein the sensed feature data comprise ear contact pattern data.

12. The head wearable device of claim 10, wherein the sensor comprises an image sensor and wherein the sensed feature data comprise image data.

13. The head wearable device of claim 12, wherein the image sensor comprises a depth of field that is greater than 0.1 cm and less than 100 cm.

14. The head wearable device of claim 12, wherein the image sensor comprises an infrared image sensor.

15. The head wearable device of claim 10, comprising rendering circuitry that is activated responsive to authentication of the identity of the wearer.

16. The head wearable device of claim 10, comprising an ear illumination source.

17. The head wearable device of claim 16, wherein the ear illumination source projects a pattern and wherein the sensed feature data comprise patterned ear dimension data.

18. A head wearable device comprising:
- an earbud body and an extension that is to be inserted into a portion of an ear;
- a sensor coupled to the earbud body, wherein the sensor comprises a field of view that encompass at least a portion of an ear of a wearer to acquire sensed feature data;
- memory that stores feature data;
- anti-spoofing circuitry, operatively coupled to the sensor, that receives at least a portion of the sensed feature data for analysis of one or more of ear heat energy and ear muscle movement that indicate that the ear is not an artificial ear;
- authentication circuitry, operatively coupled to the sensor, that receives and compares at least a portion of the sensed feature data from the sensor to stored feature data in the memory to authenticate an identity of the wearer; and
- termination circuitry, operatively coupled to the anti-spoofing circuitry and the authentication circuitry, that terminates one or more actions of the head wearable device responsive to one or more of spoofing and failure to authenticate.

19. The head wearable device of claim 18, wherein the sensor comprises an image sensor and wherein the sensed feature data comprise image data.

20. The head wearable device of claim 19, wherein the image sensor comprises an infrared image sensor.

* * * * *